F. C. WEGNER.
POULTRY PERCH.
APPLICATION FILED AUG. 11, 1915.

1,247,471.

Patented Nov. 20, 1917.

Witnesses

Inventor
F.C. Wegner
By
Attorneys

UNITED STATES PATENT OFFICE.

FRED C. WEGNER, OF ARCHER, NEBRASKA.

POULTRY-PERCH.

1,247,471.  Specification of Letters Patent.  Patented Nov. 20, 1917.

Application filed August 11, 1915. Serial No. 44,972.

*To all whom it may concern:*

Be it known that I, FRED C. WEGNER, a citizen of the United States, residing at Archer, in the county of Merrick, State of Nebraska, have invented certain new and useful Improvements in Poultry-Perches; and I do hereby declare the following to be a full, clear, and exact description of the invention, such as will enable others skilled in the art to which it appertains to make and use the same.

The present invention is directed to improvements in poultry perches, and has for its object to provide a device of this character so constructed that a medicated solution may be applied thereto and prevent mites and other vermin from congregating thereon.

A further object of the invention is to provide a perch, constructed in such a manner that the fumes from the medicated solution with which the perch is saturated serve to exterminate lice or the like on the fowls.

A still further object of the invention is to provide a perch so formed that a medicated solution can be applied thereto without removing or disturbing the perch.

A still further object of the invention is to provide a perch bar so constructed that the same will be constantly supplied with a medicated solution.

With these and other objects in view, this invention resides in the novel features of construction, formation, combination and arrangement of parts to be hereinafter more fully described, claimed and illustrated in the accompanying drawing, in which:—

Figure 1:
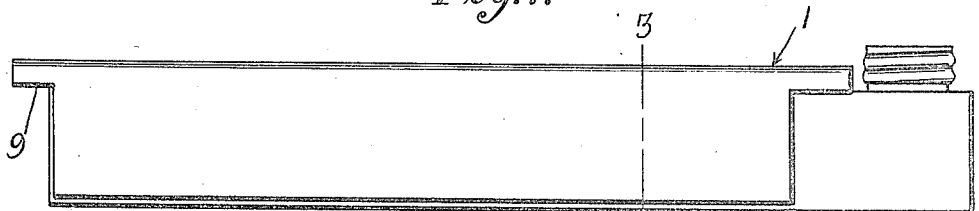
Figure 1 is a side elevation of the perch.
Figure 2:
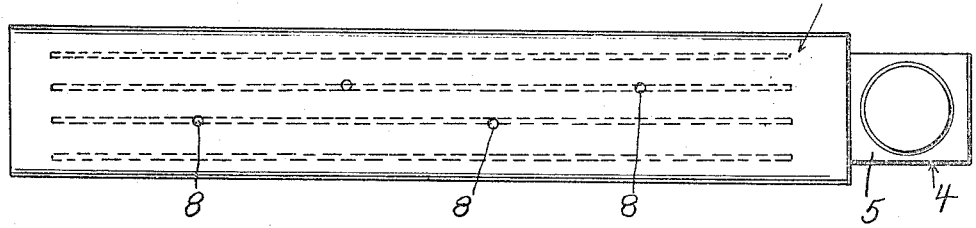
Fig. 2 is a top plan view of the same.

Referring to the drawing 1 indicates the perch bar, which is formed from wood, and may be of any desired length, said bar being provided with longitudinal grooves 2 and 3, the purpose of which will appear later.

Associated with the perch bar is a tank 4, said tank being partially closed by a cover 5, which is provided with a filling opening 6, so that a medicated solution can be easily placed therein.

Figure 3:
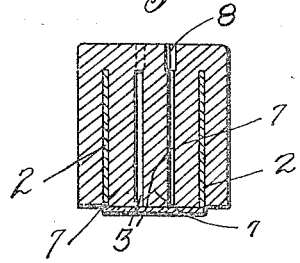
Fig. 3 is a sectional view on line 3—3 of Fig. 1.
Figure 4:
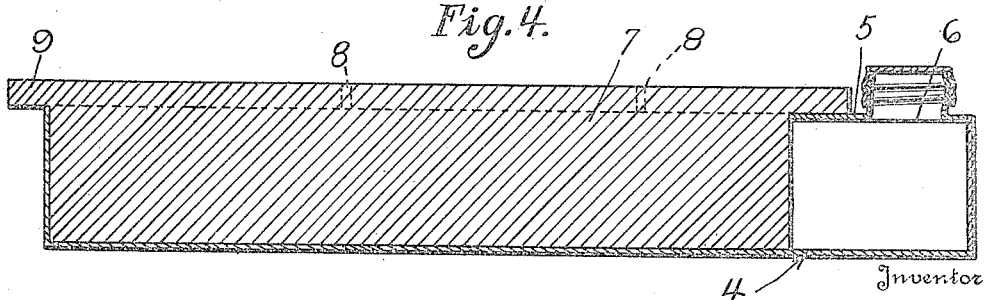
Fig. 4 is a longitudinal sectional view through the same.

The sides of the tank engage the grooves 2, so that the webs 7 depend into the tank, as clearly shown in Fig. 3 of the drawing, so that the bar will be thoroughly saturated with the solution, the solution being in a short time entirely absorbed so that none will remain in the tank.

The top of the bar 1 is provided with a plurality of perforations 8, which open into the grooves 3, and permit the solution in the tank to pass upwardly therethrough and flow over the face of the perch where it will be quickly absorbed.

It will be of course understood that any number of perches may be used in the hen house, said perches being so mounted that the closed end of the tanks will be in convenient reach for filling. The tanks are substantially the same length as the perch bars, said bars having their ends provided with extensions 9, which serve to exclude dust and dirt from entering the adjacent end of the tank.

It is obvious that a perch saturated with a medicated solution will exterminate the lice which collect thereon.

It will be noted that the perch bars terminate short of the closed ends of the tanks, said ends thus affording each a reservoir into which a fresh supply of the solution may be introduced and will flow through the grooves 3 to be quickly absorbed by the bars.

What is claimed is:—

A poultry perch comprising a bar having a plurality of grooves terminating short of the upper surface of said bar and opening upon the bottom thereof to provide webs, said bar having openings in the top communicating with certain of said grooves, a tank supporting said bar and having its sides extending into the outer of said grooves whereby the bottoms of said webs are in engagement with the bottom of said tank, said bar terminating short of one end of said tank to provide a reservoir for the reception of a medicament.

In testimony whereof, I affix my signature, in the presence of two witnesses.

FRED C. WEGNER.

Witnesses:
C. O. MOORE,
JOHN L. KAMERER.

Copies of this patent may be obtained for five cents each, by addressing the "Commissioner of Patents, Washington, D. C."